United States Patent
Berrada

(10) Patent No.: US 6,826,589 B2
(45) Date of Patent: Nov. 30, 2004

(54) REQUEST MECHANISM FOR A COMMUNICATION SYSTEM BETWEEN INTERACTIVE TERMINALS AND MASTER STATION

(75) Inventor: Marouane Berrada, Creteil (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/451,270

(22) Filed: Nov. 30, 1999

(65) Prior Publication Data

US 2003/0187981 A1 Oct. 2, 2003

(30) Foreign Application Priority Data

Dec. 1, 1998 (FR) .............................................. 9815141

(51) Int. Cl.[7] .............................................. G06F 15/16
(52) U.S. Cl. ...................... 709/200; 370/436; 370/437; 370/447; 370/462; 370/516; 370/517; 370/519
(58) Field of Search .......................... 709/200; 370/319, 370/321–330, 436, 437, 447, 462, 516, 517, 519, 344–348, 458

(56) References Cited

U.S. PATENT DOCUMENTS

| | | | | |
|---|---|---|---|---|
| 5,267,243 A | * | 11/1993 | Sarraf .......................... | 370/458 |
| 5,515,379 A | * | 5/1996 | Crisler et al. ................ | 370/347 |
| 5,590,131 A | * | 12/1996 | Kabatepe ..................... | 370/461 |
| 5,594,738 A | * | 1/1997 | Crisler et al. ................ | 370/347 |
| 5,625,628 A | * | 4/1997 | Heath .......................... | 370/321 |
| 5,638,374 A | * | 6/1997 | Heath .......................... | 370/322 |
| 6,088,344 A | * | 7/2000 | Wales et al. ................. | 370/329 |
| 6,118,762 A | * | 9/2000 | Nomura et al. .............. | 370/230 |
| 6,151,329 A | * | 11/2000 | Berrada et al. .............. | 370/447 |
| 6,240,073 B1 | * | 5/2001 | Reichman et al. ........... | 370/319 |
| 6,310,886 B1 | * | 10/2001 | Barton ......................... | 270/462 |
| 6,469,991 B1 | * | 10/2002 | Chuah ......................... | 370/329 |

OTHER PUBLICATIONS

Nedo Celandroni and Erina Ferro, "The FODA–TDMA Satellite Access Scheme: Presentation, Study of the system, and Results", IEEE Trans. on Comm., vol. 39, no. 12, Dec. 1991.

Tho Le Ngoc and Jahangir I. Mohammed "Combined Free/Demand Assignment Multiple Access (CFDAMA) Protocols for Packet Satellite Communications", Proc. of 2$^{nd}$ IEEE Inter. Conf. on Universal Personal Communications, Ottawa, Canada, Oct. 12–15, 1993, vol. 2, pp. 824–828.

* cited by examiner

*Primary Examiner*—John Follansbee
*Assistant Examiner*—Jinsong Hu

(57) ABSTRACT

The invention relates to a communication system comprising a plurality of interactive terminals which communicate with a master station via a transmission medium. The invention is particularly applied to interactive satellite broadcast systems. The invention relates to a request mechanism permitting the interactive terminals to have reservations assigned to them on the transmission medium for transmitting information to the master station. When a terminal receives assignments that have not yet expired, it temporarily stores them in an assignment memory. The invention comprises taking the number of assignments contained in this memory into account when a new request is transmitted. It thus permits to avoid that requests for the assignments that have already been granted are formulated again.

10 Claims, 2 Drawing Sheets

REQUEST MECHANISM FOR A COMMUNICATION SYSTEM BETWEEN INTERACTIVE TERMINALS AND MASTER STATION

The invention relates to a communication system comprising at least a master station and a plurality of terminals intended to communicate with the master station via a transmission medium, said terminals comprising means for requesting the assignment of a certain number of reservations on the transmission medium. The invention also relates to a terminal intended to be used in such a system, and a request method permitting such a terminal to be assigned a certain number of reservations on a transmission medium.

The invention is notably applied to interactive satellite broadcast systems.

BACKGROUND OF THE INVENTION

The article by Nedo Celandroni and Erina Ferro, entitled "The FODA-TDMA Satellite Access Scheme: Presentation, Study of the system, and Results" and published in IEEE Transactions on Communications, vol. 39, no. 12, in December 1991, describes a communication system in which a plurality of terminals can access a transmission medium via a time-division multiple access mechanism for communication with a master station. This mechanism comprises a sub-division of time into time intervals, which are dynamically assigned to the terminals at the request of these terminals. The terminals thus transmit requests which indicate the number R of time intervals they need to have at a given instant. Each terminal calculates this number R based on the number of packets present in its transmission queue the moment the terminal formulates its request.

SUMMARY OF THE INVENTION

It is an object of the invention to propose a method of optimizing the request mechanism of the terminals in order to limit the number of reservations needlessly requested by the terminals. The invention thus enables to obtain a greater efficiency in the sharing of resources, which is particularly important in the case where the transmission medium is a satellite channel, because this type of medium is particularly costly.

This object is achieved with a communication system, a terminal and a request method as respectively described in the claims 1, 2 and 3 of the present application.

The invention takes the existence into account of a transmission delay which is inherent in any communication system (and particularly large in the case of transmissions by satellite). This delay is subject to jitter. The master station is thus to take the maximum value of the transmission delay into account when it transmits reservation assignments to the terminals: these assignments are to be sent sufficiently early to arrive before they expire (that is to say, before the start of the corresponding time interval). The assignments arriving early are stored in an assignment memory of the terminal until their date of expiration. The invention comprises taking assignments stored in the assignment memory of the terminal into account for calculating the number of reservations to be requested at a given instant. This strategy enables to avoid that reservations that have already been assigned by the master station are requested again. The invention thus significantly reduces the number of assigned reservations that are ultimately not used by the terminals.

These and other aspects of the invention are apparent from and will be elucidated with reference to the embodiments described hereinafter.

DETAILED DESCRIPTION OF THE DRAWINGS

Figure 1:
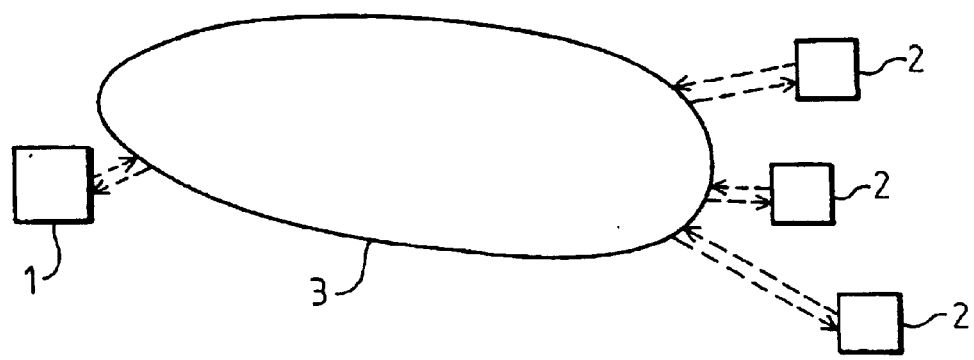
FIG. 1 represents a communication system according to the invention.

FIG. 1 represents by way of example a communication system which comprises a master station 1 and a plurality of interactive terminals 2 communicating via a transmission medium 3. There may be different types of this transmission medium. For example, this may be a cable network, a transmission by radio channel, or by satellite channel.

Figure 2:
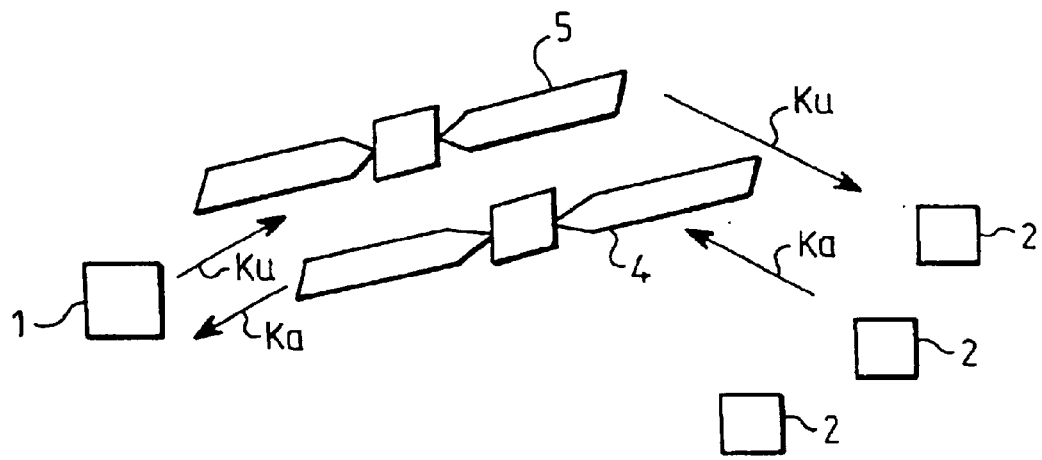
FIG. 2 represents a satellite communication system according to the invention.

In FIG. 2 one has chosen to represent a satellite communication system by way of example, because this is the case that poses the most problems in terms of transmission delays. The invention can, however, be applied to other transmission media. The terminals 2 transmit data and requests to the master station 1 via a first satellite 4 while using a first frequency band Ka, and the master station 1 broadcasts data and control information to the terminals 2 via a second satellite 5 while using a second frequency band Ku.

In the example that has just been described, the interactive terminals 2 access the transmission medium 3 via a time-division multiple access mechanism TDMA to communicate with the master station. For this purpose, the time is subdivided into time intervals and time intervals are dynamically assigned to the terminals by the master station at the request of said terminals. This means that the reservations on the transmission medium, which are requested by the terminals and assigned by the master station, are formed by time intervals. When time intervals remain available, the master station can freely assign them to terminals that have not asked for them. The terminals transmit, for example, their requests in the time intervals assigned to them after the user data. In that case, when they start communicating, the terminals are to wait for the master station to have an available time interval freely assigned to them, so that they can transmit a request.

In response to the requests received, the master station assigns a certain number of time intervals to the terminals. These assignments are broadcast to the terminals and, in order to be used, must be received before they expire.

Each terminal 2 includes a memory 10 which is a transmission queue and in which the data it has to transmit are stored in a packetized way. When a terminal formulates a request for being assigned a certain number of time intervals, it takes account of the number B of packets stored in this transmission memory.

Various request mechanisms have been proposed. For example, in the article cited above, the authors propose a first mechanism X1 which comprises the transmission of requests that indicate the contents of the transmission memory of the terminal at a given instant. At the network head-end, each new request replaces the previous request. A second mechanism X2 is proposed in the article "Combined Free/Demand Assignment Multiple Access (CFDAMA) Protocols for Packet Satellite Communications" by Tho Le-Ngoc and Jahangir I Mohammed, published in Proceedings of 2$^{nd}$ IEEE International Conference on Universal Personal Communications, Ottawa, Canada, 12–15, Oct. 1993, vol. 2, pp. 824–828. This second mechanism X2 comprises calculating the number of reservations that have already been requested and are still to be granted to the terminal: a counter is incremented by unity each time a reservation is requested, and decremented by unity each time an assignment is received. Each request transmitted by the terminal indicates the difference between the contents of the transmission memory and the value of this counter. At the master station, each new request is added to the previous request.

The invention is independent of the request mechanism used. As will now be explained, the invention comprises an improvement of the performance of the request mechanism used by taking into account, for formulating the request, assignments stored in the assignment memory of the terminal.

Any transmission medium introduces a transmission delay subject to much or little jitter which may vary depending on the type of the medium. This transmission delay is generally shorter than a maximum value. It is thus necessary that the delay separating the sending of an assignment by the master station and the expiration of this assignment is greater than or equal to this maximum value. The assignments that are received before they expire are stored in an assignment memory prior to their being used. The assignments stored in the assignment memory of the terminal correspond to requests that have already been granted by the master station. But these assignments have not yet been used by the terminal. The data for which they have been formed are thus still standby in the transmission memory. It is an object of the invention to avoid the formation of new requests for these data. Therefore, for transmitting a request, the invention comprises taking the number of assignments stored in the assignment memory into account. Advantageously, the number R of reservations, calculated by means of any conventional request mechanism, is replaced by the following value R':R'=R'−A, where A indicates the number of assignments stored in the assignment memory.

Figure 3:
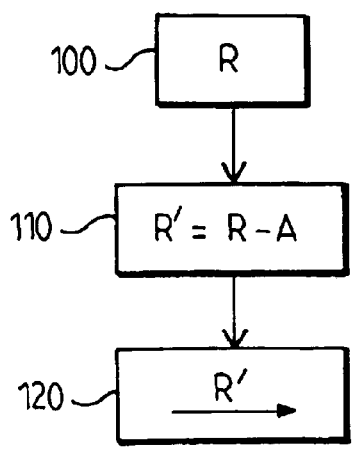
FIG. 3 represents a request method according to the invention.

FIG. 3 represents a request method according to the invention: in box 100 the terminal calculates the value R by implementing a conventional request calculation method. In box 110 it calculates the value R'=R−A. In box 120 it transmits the request R'.

Figure 4:
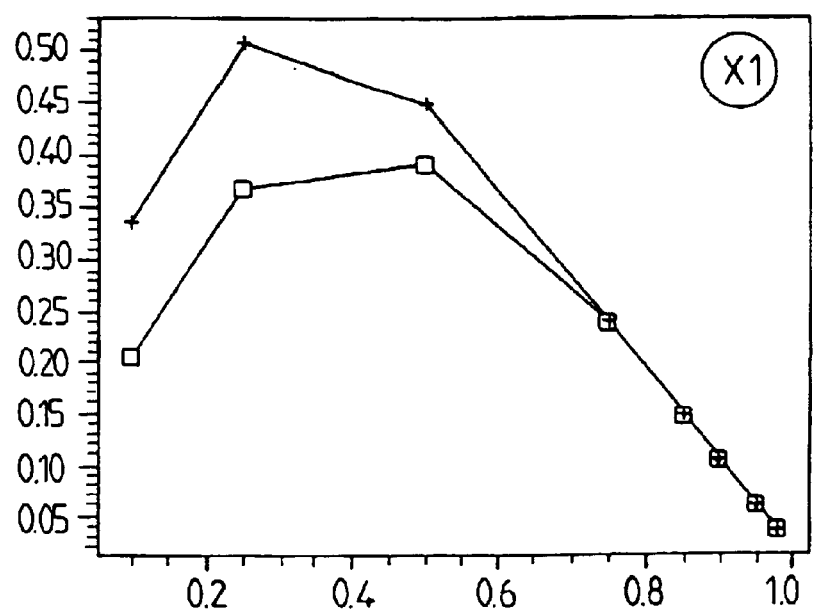
FIGS. 4 and 5 indicate the results obtained with the invention.
Figure 5:
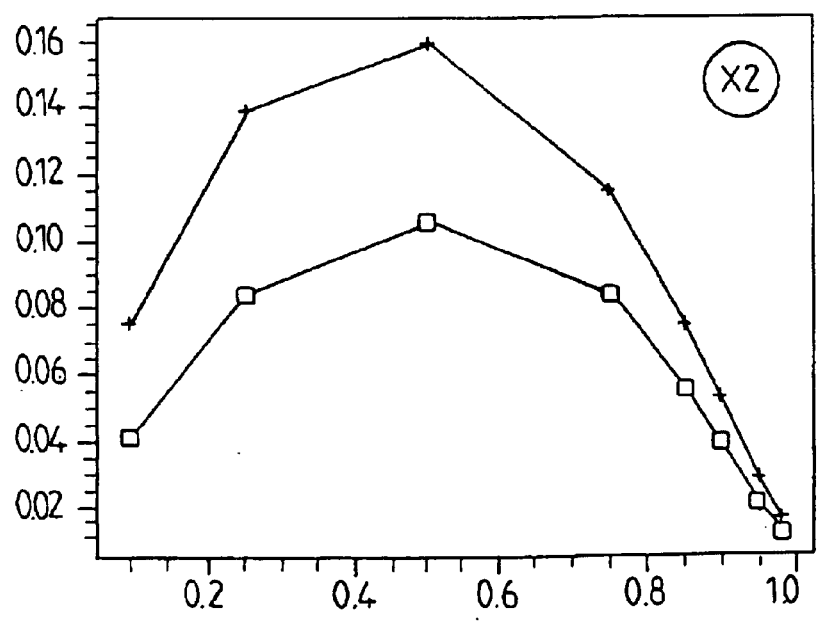

FIGS. 4 and 5 represent significant curves of the improvements provided by the invention in the case of a satellite communication system. FIG. 4 represents the ratio of non-used assignments as a function of the load ratio of the transmission network with the first request mechanism X1. The squares indicate the results obtained with the invention and the crosses indicate the results obtained without the invention. FIG. 5 represents the results obtained when the second request mechanism X2 is used. These two curves show that the invention permits to significantly reduce the ratio of unused assignments, especially for small and medium-sized loads. The number of reservations that remain available when the master station has granted all the requests of the terminals is thus higher. The master station can assign them to terminals that have not requested them. This improves the performance of the system; it particularly permits to reduce the average rotational delay in the transmission memory for a terminal that begins to communicate after a period of inactivity.

In the example of embodiment that has just been described, the terminals access the transmission medium via a time-division multiple access mechanism. This is not restrictive. The invention is applicable when other mechanisms for accessing the transmission media are used, for example, a time-division multiple access mechanism combined with a frequency-division multiple access mechanism FDMA, or with a code-division multiple access mechanism CDMA. Depending on the case under consideration, the reservations assigned by the master station are formed by time intervals, combinations of time interval/carrier, combinations of time interval/carrier/code.

What is claimed is:

1. A communication system comprising:
   a master station, wherein the master station uses a transmission delay in determining a maximum delay value that is longer than the value of transmission delay, so that reservations assigned from the master station do not expire before being used, wherein the transmission delay is due to jitter; and
   a plurality of terminals adapted to communicate with the master station via a transmission medium, request an assignment of a certain number of reservations on the transmission medium, and
   at least one terminal of the plurality of terminals stores a number of reservations that have already been assigned to the at least one terminal and which the at least one terminal has not yet used, and formulate the number of reservations to be requested and avoiding requesting reservations that have been already assigned by the master station.

2. The communication system according to claim 1, wherein the transmission medium is a satellite channel.

3. The communication system according to claim 1, wherein the transmission medium is a cable network.

4. The communication system according to claim 1, wherein the transmission medium is a radio channel.

5. The communication system according to claim 1, wherein said at least one terminal of the plurality of terminals includes a terminal that includes a counter which indicates a number of reservations that have already been assigned to said terminal that includes a counter and which said terminal that includes a counter has not yet used.

6. A terminal adapted to communicate with a master station of a communication system via a transmission medium, said terminal comprising:
   means for requesting an assignment of a certain number of reservations on the transmission medium;
   a counter which indicates a number of reservations that have already been assigned to the terminal and which the terminal has not yet used; and
   means for formulating the number of reservations to be requested while a value of said counter is taken into account;
   wherein the number of reservations assigned from the master station include taking into account a value of transmission delay from jitter so that the master station determines a maximum delay value that is longer than a value of the transmission delay from jitter, so that the reservations do not expire before being used, thereby avoiding requesting reservations that have been already assigned by the master station.

7. The communication system according to claim 6, wherein the transmission medium is a satellite channel.

8. The communication system according to claim 6, wherein the transmission medium is a cable network.

9. The communication system according to claim 6, wherein the transmission medium is a radio channel.

10. A request method enabling a terminal adapted for communication with a master station of a communication system via a transmission medium to have a certain number of reservations assigned to it on the transmission medium, the method comprising the steps of:

storing a counter value that indicates a number of reservations that have already been assigned to said terminal and which the terminal has not yet used; and formulating the number of reservations to be requested for said terminal value while the counter value is taken into account; and wherein the number of reservations assigned from the master station include taking into account a value of transmission delay from jitter, and, the master station determining a maximum delay value that is longer than a value of the transmission delay from jitter, so that the reservations do not expire before being used, thereby avoiding requesting reservations that have been already assigned by the master station.

* * * * *